United States Patent
Bertrand

(10) Patent No.: US 7,487,669 B2
(45) Date of Patent: Feb. 10, 2009

(54) METHOD OF ESTIMATING A RISK OF A LACK OF CONNECTING WITH THE GROUND FOR A MOTOR VEHICLE

(75) Inventor: David Bertrand, Besançon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 12/002,203

(22) Filed: Dec. 13, 2007

(65) Prior Publication Data

US 2008/0156086 A1    Jul. 3, 2008

(30) Foreign Application Priority Data

Dec. 13, 2006    (FR)    ................... 06 55483

(51) Int. Cl.
*G01M 17/02* (2006.01)
(52) U.S. Cl. ......................... 73/146; 701/80
(58) Field of Classification Search .................. 73/146; 701/80
See application file for complete search history.

(56) References Cited

U.S. PATENT DOCUMENTS 5,502,433 A    3/1996    Breuer et al.
6,597,980 B2 *    7/2003    Kogure .................. 701/80
6,923,050 B2 *    8/2005    Levy et al. .............. 73/146
7,069,135 B2 *    6/2006    Bertrand ................. 701/80
7,099,765 B2 *    8/2006    Bertrand ................. 701/73
7,377,300 B2 *    5/2008    Daval .................... 152/152.1
2005/0257609 A1    11/2005    Mancosu et al.

FOREIGN PATENT DOCUMENTS

| DE | 101 07 862 A1 | 9/2002 |
|---|---|---|
| EP | 0 841 550 A2 | 5/1998 |
| EP | 1 076 235 A1 | 2/2001 |
| EP | 1 132 271 A2 | 9/2001 |
| EP | 1 273 496 A2 | 1/2003 |
| EP | 1 457 388 A1 | 9/2004 |
| FR | 2 815 712 | 4/2002 |
| WO | WO 2004/000620 A1 | 12/2003 |

OTHER PUBLICATIONS

International Search Report (and English translation) issued in the corresponding foreign application.

* cited by examiner

*Primary Examiner*—Andre J Allen
(74) *Attorney, Agent, or Firm*—Cohen Pontani Lieberman & Pavane LLP

(57) ABSTRACT

According to the method, the risk is estimated as a function of a maximum grip potential $\mu_{max}$ of the tire, a utilization percentage $P_u$ representative of the fraction of the maximum grip potential of the tire that is being used, and a magnitude $P_s$ associated with a risk of the tire hydroplaning, in particular a loss of tire area.

11 Claims, No Drawings

METHOD OF ESTIMATING A RISK OF A LACK OF CONNECTING WITH THE GROUND FOR A MOTOR VEHICLE

FIELD OF THE INVENTION

The present invention relates to a method of estimating a risk of a lack of connection with the ground for a motor vehicle, said lack being associated with the grip state of at least one tire of the vehicle.

BACKGROUND OF THE INVENTION

Certain motor vehicles are fitted with devices for providing assistance in driving and having the purpose of improving the road holding of the vehicle. Such driving assistance devices can be classified into two categories. A first category comprises devices that act in active manner on the behavior of the vehicle to take the place of the driver in the event of a dangerous situation. This first category includes, for example: active systems of the type that prevent the brakes locking (ABS) or of the stability management type (ESP). The second category comprises devices that provide information for the purpose of warning the driver that the driver is in a situation that is potentially dangerous.

The invention relates more particularly to devices of this second category and that serve to estimate a risk of a lack of connection with the ground for the vehicle, and to inform the driver.

In order to estimate this risk, it is possible to use numerous known parameters, in particular outside temperature. A temperature sensor fitted to a vehicle can warn the driver whenever the outside temperature drops below a certain threshold at which it is possible that ice will form on the road.

This estimate of the risk of a lack of connection with the ground is simple but does not enable accurate and reliable results to be obtained. This estimate assumes that below a certain temperature, the road is icy, but it does not verify that assumption. Thus, it is common for the vehicle to trigger a warning even though there is no real risk of a lack of connection with the ground. Furthermore, in certain situations, measuring temperature will not detect a risk of a lack of connection with the ground even when one exists, for example when there is oil on the road or when the tires are very worn.

Parameters other than temperature can be used for estimating the risk of a loss of connection with the ground, but none of them is capable of providing an estimate that is effective and reliable under all circumstances.

OBJECTS AND SUMMARY OF THE INVENTION

An object of the invention is to propose a method of estimating a risk of a lack of connection with the ground for a motor vehicle that is more reliable and that presents better performance than known methods.

To this end, one aspect of the invention provides a method of estimating a risk of a lack of connection with the ground for a motor vehicle, this lack being associated with the grip state of at least one tire of the vehicle, wherein the risk is estimated as a function of the following three parameters:

a maximum grip potential $\mu_{max}$ of the tire;
a utilization percentage $P_u$ of the maximum grip potential of the tire that is being used; and
a magnitude $P_s$ associated with a risk of the tire hydroplaning, in particular a loss of tire area.

Assuming that a tire is subjected to the following:

a resultant $F_x$ of longitudinal forces (essentially comprising acceleration and braking forces);
a resultant $F_y$ of lateral forces (essentially comprising side forces); and
a resultant $F_z$ of vertical forces;

then the following definitions apply.

At a given instant, the grip potential $\mu$ of the tire is defined as being the ratio of the resultant of the longitudinal and lateral forces divided by the resultant of the vertical forces:

$$\mu = \frac{\sqrt{F_x^2 + F_y^2}}{F_z}$$

At a given instant, the maximum grip potential $\mu_{max}$ of the tire on the ground is defined as being the maximum value that the grip potential $\mu$ can take. This maximum grip potential $\mu_{max}$ depends on several factors including the nature of the ground (of the road) or its state of wear, the temperature of the ground and also of the tire, or indeed weather factors involving, for example, the presence of water or snow on the ground.

At a given instant, the utilization percentage $P_u$ of the maximum grip potential $\mu_{max}$ of the tire that is being used is defined by the following formula:

$$P_u = \frac{\mu}{\mu_{max}} \cdot 100$$

This utilization percentage $P_u$ corresponds to the percentage represented by the grip potential that is actually in use relative to the maximum grip potential. This value can vary over the range 0% to 100%. Naturally, the closer this value is to 100%, the greater the risk of the tire losing grip.

The contact area of the tire is defined as being the area of the tire that is in contact with the ground.

The magnitude $P_s$ is defined as a magnitude associated with a risk of hydroplaning, i.e. associated with loss of contact area between the tire and the ground. The loss of area is the percentage of the contact area of the tire that is not in direct contact with the ground.

While a tire is running on dry ground and under normal conditions of use, the entire contact area of the tire is in direct contact with the ground. In contrast, when the tire is running on ground that is soaking wet, then an hydroplaning phenomenon can occur in that a fraction of the contact area of the tire is no longer in direct contact with the ground but is in contact with a fine film of water. The loss of area is equal to 0% when running on dry ground and can be as great as 100% when all direct contact between the tire and the ground is lost.

The maximum grip potential $\mu_{max}$, the utilization percentage $P_u$ of the maximum grip potential $\mu_{max}$, and the magnitude $P_s$ are parameters that are known, as are methods of measuring them. Thus, in the state of the art, and in particular from the following documents WO 03/066399, WO 03/066400, WO 2004/000620, and U.S. Pat. No. 5,502,433, the following are known:

methods of measuring the maximum grip potential $\mu_{max}$ of a tire, those methods making use for example of measurements obtained by means of force sensors;
methods of measuring the utilization percentage $P_u$ of the maximum grip potential $\mu_{max}$, those methods not necessarily requiring any prior measurement of the maximum grip potential of the tire; and methods of measuring a magnitude $P_s$ that is associated with a risk of the tire hydroplaning.

In accordance with the invention, it has been found that the set of parameters comprising the maximum grip potential $\mu_{max}$, the utilization percentage $P_u$ of the maximum grip potential $\mu_{max}$, and the magnitude $P_s$ associated with a risk of the tire hydroplaning constitutes a selection of parameters that is well adapted to estimating a risk of a lack of connection with the ground for a motor vehicle. This selection of a small number of parameters makes it possible to assess most situations that present a risk of losing grip, while avoiding the risk of triggering false alarms.

Combining the measurements of these three parameters is most advantageous for estimating an overall risk of a lack of connection with the ground since the parameters are complementary, each being associated with a particular kind of risk of losing grip.

The maximum grip potential $\mu_{max}$ of the tire is particularly suitable for informing the driver that as a result of particular weather conditions, of the wear of the ground surface, or of any other reason not necessarily associated with the tires being subjected to extreme stress, at least one of the tires of the vehicle presents little grip on the ground.

The utilization percentage $P_u$ of the maximum grip potential of the tire is particularly appropriate for informing the driver that the way the driver is driving is stressing the tires greatly and runs the risk of losing grip. Under such circumstances, the grip of the tires on the ground is not necessarily small, but the stresses caused by driving are large compared with the available grip potential. The estimated safety margin is small.

The magnitude $P_s$ associated with a risk of the tire hydroplaning is particularly appropriate when the ground is wet and the speed of the vehicle is high for warning the driver that inappropriate stress on the tires might lead to a loss of contact area between the tires and the ground by an hydroplaning effect.

To obtain an estimate of the quality of the risk of a lack of connection with the ground, it is essential to measure each of these three complementary parameters. These three parameters are independent and they cannot be deduced from one another.

The method of the invention may also include one or more of the following characteristics:

The risk of a lack of connection with the ground is estimated by comparing, for each parameter, a corresponding reference value $V_r$ that is a function of at least one measurement of the parameter with at least one threshold $S''$ associated with the parameter and separating a range of values that are risky from a range of values without risk.

The threshold $S''$ varies as a function of the running conditions of the vehicle, preferably as a function of the load of the vehicle and/or of its speed. Thus, preferably, it is possible to vary the threshold as a function of the level of load on the vehicle or of the speed of the vehicle. This makes it possible to associate the kinetic energy of the vehicle with a time period for warning the driver of the vehicle of the estimated risk of a lack of connection with the ground. The greater the kinetic energy of the vehicle, the more it is desirable to warn the driver quickly.

If for at least one parameter, the reference value $V_r$ crosses the threshold $S''$ to reach the risky range, the driver of the motor vehicle is informed of the estimated risk of a lack of connection with the ground. Being thus informed about the risk of a lack of connection with the ground, the driver of the motor vehicle can change the way the vehicle is being driven in order to reduce the risk. Since this parameter is associated with a particular risk, it is important to warn the driver of the risk of a lack of connection with the ground, even if only one of the three parameters takes on a risky value. It is not necessary for each of the three parameters to take on a risky value before warning the driver.

If for at least one parameter, the reference value $V_r$ crosses the threshold $S''$ to reach the risky range, and if the reference value $V_r$ remains in said risky range while the vehicle is running along a predetermined distance $L''$ measured from the time at which the threshold $S''$ was crossed, then the driver of the motor vehicle is informed of the estimated risk of a lack of connection with the ground. Given that the reference value is generally noisy (because the measurement of the selected parameter as obtained by conventional devices—generally comprising means for measuring torque or vibration—is itself generally noisy), it is preferable to inform the driver of an estimated risk of a lack of connection with the ground only when the reference value remains in the range of values that are risky for a duration corresponding to the vehicle running along the predetermined distance. This avoids untimely warnings as much as possible.

The reference value $V_r$ of a parameter is defined as being equal to a single measurement of the parameter. This definition of the reference value is particularly simple.

When the parameter P is the maximum grip potential $\mu_{max}$ of the tire or the utilization percentage $P_u$ of the maximum grip potential $\mu_{max}$ of the tire, then the reference value $V_r$ is defined by a linear combination of a plurality of measurements of the parameter, e.g. two or four measurements, the different measurements relating to different tires of the vehicle. Thus, a plurality of measurements are taken into account for defining the reference value, thereby limiting the influence of any abnormally noisy measurement and making the pertinence of a warning to the driver more reliable.

The linear combination of measurements is selected from:
an average of the measurements; and
a center of gravity of the measurements such that each measurement is weighted by a value for the vertical load $F_z$ supported by the tire corresponding to the measurement.

Under such circumstances, by weighting the measurements of the selected parameter by vertical load values, the reference value is influenced mainly by the measurement of the parameter that presents the greatest amplitude and the greatest signal-to-noise ratio:

$$\frac{\text{amplitude of the signal for the selected parameter}}{\text{noise polluting the signal}}$$

i.e. the measurement that is the most accurate and the most reliable. Thus, the influence of measurement noise on the reference value is limited, particularly when the vehicle is turning, thereby causing loads to be transferred.

When the parameter P is associated with a loss of tire area $P_s$, the reference value $V_r$ is defined as being the maximum value of a plurality of measurements of the parameter $P_s$, e.g. two or four measurements, the different measurements relating to different tires of the vehicle. Loss of contact area for just one of the tires of the vehicle is considered as being dangerous, and thus pertinent for influencing the way the vehicle is being driven. Thus, it is the tire having the greatest observed loss of grip that needs to be privileged in estimating the risk of losing grip and thus a lack of connection with the ground for the vehicle.

Each measurement is performed by a device selected from:
- a device provided with stationary means that are decoupled in rotation from the tire; and
- a device provided with on-board means in a member of a rotary assembly comprising a tire of the vehicle and/or a member coupled to rotate with the tire.

A first level of risk of a lack of connection with the ground is estimated by comparing, for at least one parameter, the reference value $V_r$ with a first threshold $S^1$, and a second level of risk of a lack of connection with the ground is estimated by comparing the reference value $V_r$ with a second threshold $S^2$, the risk of the second level being higher than the risk of the first level.

MORE DETAILED DESCRIPTION

The invention can be better understood on reading the following description made purely by way of example.

The method of estimating a risk of a lack of grip with the ground for a motor vehicle in accordance with the invention consists in estimating the risk as a function of three parameters P as mentioned above:
- a maximum grip potential $\mu_{max}$ of the tire;
- a utilization percentage $P_u$ of the maximum grip potential tire that is being used; and
- a magnitude $P_s$ associated with a risk of the tire hydroplaning, in particular a loss of tire area.

More precisely, the risk of a lack of connection with the ground is estimated by comparing, for each parameter P, a reference value $V_r$ that is a function of at least one measurement of the parameter with a threshold $S''$ associated with the parameter and separating a range of values with no risk from a range of risky values.

The first measured parameter P is the maximum grip potential $\mu_{max}$ of the tire: $P=\mu_{max}$.

A reference value $V_r$ is defined as a function of at least one measurement of $P=\mu_{max}$.

First Case

At a given instant, only a single measurement of $\mu_{max}$ is available. This measurement is delivered, for example, by a device fitted with stationary means that are decoupled from the rotation of each tire of the vehicle. In a variant, the measurement could be delivered by a device having means on board in a member of a rotary assembly, said assembly comprising a tire of the vehicle and/or at least one member coupled to rotate with the tire of the vehicle.

In this first case, the reference value $V_r$ is defined as being equal to the sole measurement of the selected parameter $\mu_{max}$, thus giving the following relationship R1:

$$V_r = \mu_{max} \quad (R1)$$

Second Case

At a given instant, a plurality of measurements for $\mu_{max}$ are available (i.e. at least two measurements), the various measurements relating to different tires of the vehicle, e.g. two pairs of tires carried respectively by a front axle and a rear axle.

By way of example, these four measurements may be delivered by four devices, each comprising on-board means in a member of a rotary assembly as defined for the first case. In a variant, at least one of the measurements may be delivered by a device fitted with stationary means that are decoupled from the rotation of each tire of the vehicle.

In this second case, the reference value $V_r$ is defined as being a linear combination of the four measurements of the parameter $\mu_{max}$. Preferably, this linear combination corresponds to a center of gravity of the measurements, such that each measurement is weighted by a value $F_z$ for the vertical load supported by the tire corresponding to the measurement. This gives the following relationship R2:

$$V_r = \mu_{maxdecl} = \frac{1}{\sum_{FL,FR,RL,RR} F_Z^k} \cdot \sum_{FL,FR,RL,RR} F_Z^k \cdot \mu_{max}^k \quad (R2)$$

where FL means the front left tire, FR the front right tire, RL the rear left tire, and RR the rear right tire.

If only two measurements for $\mu_{max}$ are available, e.g. relating to two tires on the same front or rear axle, then the above relationship R2 becomes the following relationship R3:

$$V_r = \mu_{maxdecl} = \frac{1}{F_Z^L + F_Z^R} \cdot (F_Z^L \cdot \mu_{max}^L + F_Z^R \cdot \mu_{max}^R) \quad (R3)$$

where the exponent L indicates the left tire and the exponent R indicates the right tire.

If the loads $F_z$ are not known, the reference value $V_r$ can be defined as being the average of the measurements. This gives the following relationship R4 (for two measurements relating to two tires on the same axle, by way of example):

$$V_r = \mu_{maxdecl} = \frac{1}{2} \cdot (\mu_{max}^L + \mu_{max}^R) \quad (R4)$$

where the exponent L indicates the left tire and the exponent R indicates the right tire.

After defining the reference value $V_r$ as proposed above, a risk of a lack of connection with the ground is estimated by comparing the reference value $V_r$ with at least one threshold $S''$ separating a range of estimated values that are risky from a range of estimated values that are without risk.

In the example described, the following two thresholds are used:
- $S^1=\mu^1_{maxS}$ that is pertinent for discriminating between values without risk and values that are risky on ground formed by a road that is potentially dangerous (e.g. because of its sinuous track or the poor quality of the road surface) on which the driver needs to adapt driving to a great extent to road conditions; and
- $S^2=\mu^2_{maxS}$ which is pertinent for discriminating between values without risk and values that are risky when the ground is formed by a road that is very slippery (e.g. because of the presence of snow and/or ice on the road).

Thus, a first level of a risk of a lack of connection with the ground is estimated by comparing the reference value $V_r$ with the first threshold $S^1$, and a second level of risk of a lack of connection with the ground is estimated by comparing the reference $V_r$ with the second threshold $S^2$. It should be observed that the second level risk (presence of snow and/or ice on the road) is higher than the first level risk (sinuous track or poor quality road surface).

Nevertheless, the number of thresholds $S''$ could be limited to only one, or it could be greater than two.

When:
firstly the reference value $V_r$ crosses one of the thresholds $S''$ to reach a range of values that are risky; and
secondly while the vehicle is running over a predetermined distance $L''$ measured from the time at which the threshold $S''$ was crossed, the reference value $V_r$ remains in said risky range;

then the driver of the vehicle is informed of the estimated risk of a lack of connection with the ground. This information may be supplied to the driver by conventional warning means which may be visual and/or audible, and possibly graded.

In the example described, $L''=L^1=L^2=50$ meters (m).

Nevertheless, in a variant, information may be provided to the driver as soon as the reference value $V_r$ crosses one of the thresholds $S''$ and reaches a risky range, even without waiting for a predetermined distance to be traveled.

In the example described, the thresholds are predetermined, for example: $S^1=\mu^1_{maxS}=0.5$ and $S^2=\mu^2_{maxS}=0.3$.

Nevertheless, in a variant, only one of the thresholds $S''$ need vary as a function of the running conditions of the vehicle, preferably as a function of the load of the vehicle, and/or of its speed.

The second measured parameter P is a utilization percentage $P_u$ representing the fraction of the maximum grip potential of the tire that is being used: $P=P_u$.

A reference value $V_r$ is defined as a function of at least one measurement of $P=P_u$, with this being done in a manner analogous to that described for $P=\mu_{max}$, with $\mu_{max}$ in relationships R1 to R4 being replaced by $P_u$.

Finally, in manner analogous to the case $P=\mu_{max}$, a risk of a lack of connection with the ground is estimated by comparing the reference value $V_r$ with at least one threshold $S''$ separating ranges of values that are risky from values that are without risk.

Two predetermined thresholds may be selected $S^1=P_u^{1s}$ and $S^2=P_u^{2s}$ lying respectively in the range 60% to 80% (for $S^1$) and 80% to 90% (for $S^2$). For example: $S^1=P_u^{1s}=70\%$ and $S^2=P_u^{2s}=85\%$.

Finally, the third measured parameter P is associated with the loss of tire area $P_s$: $P=P_s$.

A reference value $V_r$ is defined as a function of at least one measurement of $P=P_s$.

First Case

At a given instant, only one measurement is available for $P_s$. In a manner analogous to the cases of $P=\mu_{max}$ and $P=P_u$, the reference value $V_r$ is defined as being equal to the sole measurement of the selected parameter $P_s$.

Second Case

At a given instant, a plurality of measurements are available for $P_s$ (i.e. at least two measurements), the different measurements relating to the different tires of the vehicle, for example (as for $P=\mu_{max}$ and $P=P_u$): one or two pairs of tires carried by the front and/or rear axles.

The reference value $V_r$ is then defined as being the maximum value for the measurements of the selected parameter $P_s$, e.g. in compliance with relationship R5 below that applies to the case when four measurements are available:

$$V_r = Ps_{decl} = \max_{FL,FR,RL,RR}(Ps^k) \quad (R5)$$

where FL indicates the front left tire, FR the front right tire, RL the rear left tire, and RR the rear right tire.

Finally, in a manner analogous to the cases where $P=\mu_{max}$ and $P=P_u$, a risk of a lack of connection with the ground is estimated by comparing the reference value $V_r$ with at least one threshold $S''$ that separates ranges of risky values from values without risk.

Two predetermined thresholds may be selected $S^1=P_u^{1s}$ and $S^2=P_u^{2s}$ lying respectively in the range 30% to 50% (for $S^1$) and 60% to 80% (for $S^2$). For example: $S^1=P_u^{1s}=40\%$ and $S^2=P_u^{2s}=70\%$.

In the implementation of the invention described above, the driver of the vehicle is informed of the estimated risk of a lack of connection with the ground as soon as the reference value $V_r$ of any one of the three parameters crosses one of the thresholds $S''$ so as to reach a range of values that are risky.

I claim:

1. A method of estimating a risk of a lack of connection with the ground for a motor vehicle, this lack being associated with the grip state of at least one tire of the vehicle, wherein the risk is estimated as a function of the following three parameters:
   a maximum grip potential $\mu_{max}$ of the tire;
   a utilization percentage $P_u$ of the maximum grip potential of the tire that is being used; and
   a magnitude $P_s$ associated with a risk of the tire hydroplaning, in particular a loss of tire area.

2. The method according to claim 1, in which the risk of a lack of connection with the ground is estimated by comparing, for each parameter, a corresponding reference value $V_r$ that is a function of at least one measurement of the parameter with at least one threshold $S''$ associated with the parameter and separating a range of values that are risky from a range of values without risk.

3. The method according to claim 2, in which the threshold $S''$ varies as a function of the running conditions of the vehicle, preferably as a function of the load of the vehicle and/or of its speed.

4. The method according to claim 2, in which, if for at least one parameter, the reference value $V_r$ crosses the threshold $S''$ to reach the risky range, the driver of the motor vehicle is informed of the estimated risk of a lack of connection with the ground.

5. The method according to claim 2, in which, if for at least one parameter, the reference value $V_r$ crosses the threshold $S''$ to reach the risky range, and if the reference value $V_r$ remains in said risky range while the vehicle is running along a predetermined distance $L''$ measured from the time at which the threshold $S''$ was crossed, then the driver of the motor vehicle is informed of the estimated risk of a lack of connection with the ground.

6. The method according to claim 2, in which the reference value $V_r$ of a parameter is defined as being equal to a single measurement of the parameter.

7. The method according to claim 2, in which, when the parameter P is the maximum grip potential $\mu_{max}$ of the tire or the utilization percentage $P_u$ of the maximum grip potential $\mu_{max}$ of the tire, then the reference value $V_r$ is defined by a linear combination of a plurality of measurements of the parameter, e.g. two or four measurements, the different measurements relating to different tires of the vehicle.

8. The method according to claim 7, in which the linear combination of measurements is selected from:
   an average of the measurements; and a center of gravity of the measurements such that each measurement is weighted by a value for the vertical load $F_z$ supported by the tire corresponding to the measurement.

9. The method according to claim 2, in which, when the parameter P is associated with a loss of tire area $P_s$, the reference value $V_r$ is defined as being the maximum value of a plurality of measurements of the parameter $P_s$, e.g. two or four measurements, the different measurements relating to different tires of the vehicle.

10. The method according to claim 2, in which each measurement is performed by a device selected from:

a device provided with stationary means that are decoupled in rotation from the tire; and a device provided with on-board means in a member of a rotary assembly comprising a tire of the vehicle and/or a member coupled to rotate with the tire.

11. The method according to claim 2, in which a first level of risk of a lack of connection with the ground is estimated by comparing, for at least one parameter, the reference value $V_r$ with a first threshold $S^1$, and a second level of risk of a lack of connection with the ground is estimated by comparing the reference value $V_r$ with a second threshold $S^2$, the risk of the second level being higher than the risk of the first level.

* * * * *